United States Patent [19]

Coplan et al.

[11] 4,414,368

[45] Nov. 8, 1983

[54] CHLOROSULFONATED POLYSULFONES AND DERIVATIVES THEREOF

[75] Inventors: Myron J. Coplan, Natick; Chunghi H. Park, Sharon; Samuel C. Williams, Lexington, all of Mass.

[73] Assignee: Albany International Corp., Albany, N.Y.

[21] Appl. No.: 453,163

[22] Filed: Dec. 27, 1982

[51] Int. Cl.$^3$ .................... C08G 65/48; C08G 75/23
[52] U.S. Cl. .................................. 525/534; 525/535; 528/174
[58] Field of Search ................ 528/174; 525/535, 534

[56] References Cited

U.S. PATENT DOCUMENTS

| | | | |
|---|---|---|---|
| 3,579,475 | 5/1971 | Jones et al. | 528/174 |
| 3,875,096 | 4/1975 | Graefe et al. | 528/174 |
| 3,994,860 | 11/1976 | Brousse | 528/174 |
| 4,054,707 | 10/1977 | Quentin | 528/174 |
| 4,208,508 | 6/1980 | Hashino et al. | 528/174 |
| 4,268,650 | 5/1981 | Rose | 528/174 |
| 4,273,903 | 6/1981 | Rose | 528/174 |

*Primary Examiner*—Lester L. Lee
*Attorney, Agent, or Firm*—Kane, Dalsimer, Kane, Sullivan and Kurucz

[57] ABSTRACT

Polysulfone sulfonyl chlorides are described, which are useful as intermediates in the preparation of novel polysulfone sulfonamides.

3 Claims, No Drawings

CHLOROSULFONATED POLYSULFONES AND DERIVATIVES THEREOF

BACKGROUND OF THE INVENTION

1. Field of the Invention

This invention relates to a novel class of polysulfone derivatives suitable for the formation of membranes, coatings, ion exchange resins, ion exchange fibers, selectively permeable barrier films, and the like. The compositions of matter disclosed herein are derived from sulfonated polysulfone polymers by modification thereof through a sequence comprising chlorination of hydroxysulfonyl sites, and optionally, further reacting the chlorosulfonyl polysulfone polymer via the chlorosulfonyl substituent.

2. Brief Description of the Prior Art

Polysulfone resins were introduced in the late 1960's and have enjoyed industrial utility since the early 1970's. They are now widely regarded as among the most chemically and thermally durable thermoplastic synthetic polymers. Polysulfone sulfonates are also widely known and used; see for example U.S. Pat. Nos. 3,709,841; and 4,273,903.

SUMMARY OF THE INVENTION

The invention comprises polysulfone sulfonyl chlorides, and the method of their preparation, which comprises chlorinating the corresponding polysulfone sulfonate. The invention also comprises sulfonamide derivatives of the polysulfone sulfonyl chlorides of the invention.

DETAILED DESCRIPTION OF THE PREFERRED EMBODIMENTS OF THE INVENTION

The term "polysulfone" as used herein generally connotes polymers which are essentially fully aromatic in the sense that the polymer main chain, which is normally linear, comprises aromatic divalent radicals joined by linking groups of which at least a substantial number are the divalent-SO$_2$-radical. In general, this class of polymers is characterized by a structure which includes recurring polymer units of the formula:

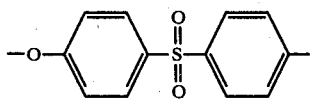

(I)

Preferred polysulfones employed as starting materials to prepare the compounds of the present invention are the sulfonates of polysulfones containing in their polymer make-up, recurring units of the formula:

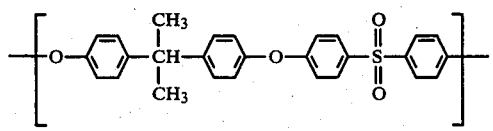

(II)

Polysulfone polymers of this type are condensation products of Bis-phenol A and 4,4'bis(dichlorophenyl sulfone) and are commercially available. In addition to the isopropylidene, oxygen and sulfone linking groups shown in the formula (II), a wide variety of other linking groups and linking group combinations may be present in the polymer, but in general about half or more of the sequences of linking groups will repeat in regular fashion determined by the specific monomers or low molecular weight oligomers used in the polymer preparatory condensation process.

In the preferred polysulfones, the number of sulfone linking groups relative to all others is rarely more than 1 out of 3, and never as much as 1 out of 2. In the case of polymers with recurring units of formula (II) described above, the number of sulfone linking groups is 1 out of 4, that is for every sulfone linking group there are 1 isopropylidene and 2 oxygen linking groups. The reason for this limitation will be understood from the following description of the invention.

It is an object of this invention to prepare derivative polysulfone polymers utilizing a parent sulfonated polysulfone polymer.

Sulfonated polysulfone polymers which may be reacted or derivatized in the method of the present invention are well known as is the method of their preparation; see for example U.S. Pat. No. 3,709,841, wherein Quentin describes a preparation of polymers in which part of the aromatic rings are substituted with hydroxysulfonyl radical (SO$_3$H, also called sulfonic groups). Other descriptions are found in U.S. Pat. No. 4,273,903 and British Pat. No. 1,350,342. In general, the sulfonation may be carried out by simple admixture of a solution or suspension of the polysulfone with a sulfonation agent. With polysulfones having the structure set forth in the formula (II) described above, the reaction may be schematically represented by the formulae:

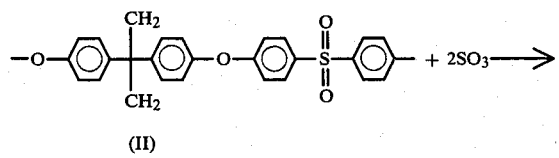

(II)

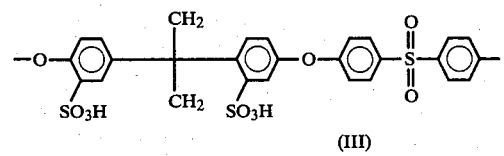

(III)

wherein sulfur trioxide is representative of the sulfonation agent. Also representative of sulfonation agents which may be employed are chlorosulfonic acid. The sulfonating agent may be employed in sufficient proportion to obtain a ratio of the number of sulfur atoms in the polymer which is within the range of between 0.4:1 to 5:1 although this is not critical. The temperature at which sulfonation takes place is also not critical. An advantageous temperature is within the range of from $-50°$ to $+80°$ C., preferably from $-10°$ to $+25°$ C.

When the desired degree of sulfonation has been reached, the desired sulfonated polymer may be separated from the reaction mixture by conventional techniques such as by filtration, washing and drying.

In the above formulae, the product polysulfone sulfonate of the formula (III) is shown to have two sulfonate groups, one on each phenyl moiety distal to the sulfone linking group. Although substitution at these locations theoretically occurs first, it will be appreciated by those skilled in the art that the sulfonate groups may substitute at other positions and in other phenyl moieties of the polymer during sulfonation. In general, the form of the sulfonated polymer will be as a precipitate collected from the sulfonation process and subsequently worked up by successive washings, generally with simple fluid non-solvents for the sulfonated polysulfone. It is necessary to free the sulfonated polymer of any residual sulfonating agent or byproducts of sulfonation, the most common of which is dilute sulfuric acid. After successive washings and collection by centrifugation or filtration, or the like, the product sulfonated polymer must be free of washing fluid, before the subsequent chlorination can be performed. If water is used it should be noted that simple oven drying of filtered sulfonated polymers is rarely effective in completely eliminating water, inasmuch as the hydroxysulfonyl substituents are very hydroscopic and tend to bind up to 3 or 4 molecules of water each. Therefore, one advantageously employs a fairly high vacuum and relatively high temperatures (in excess of 100° C.) for prolonged periods of time to dry the sulfonate. Alternative methods of drying may be utilized, such as by exposing samples to thionyl chloride while suspended in an inert solvent. The thionyl chloride is capable of extracting water, which reacts with thionyl chloride, eliminating HCl and SO2. There are other effective drying ways known to those skilled in the art but precautions need to be taken that the drying method itself does not introduce complicating side reactions, such as the inadvertent cross-linking of the sulfonated polymer due to bridging sulfone links created through reaction of hydroxysulfonyl and available abstractable hydrogens on adjacent polymer molecules.

Given the providing of a thoroughly dried hydroxysulfonyl substituted polysulfone, the sulfonyl chlorides of the invention may be prepared by conversion of the hydroxysulfonyl group. The conversion may be shown schematically in the reaction formulae:

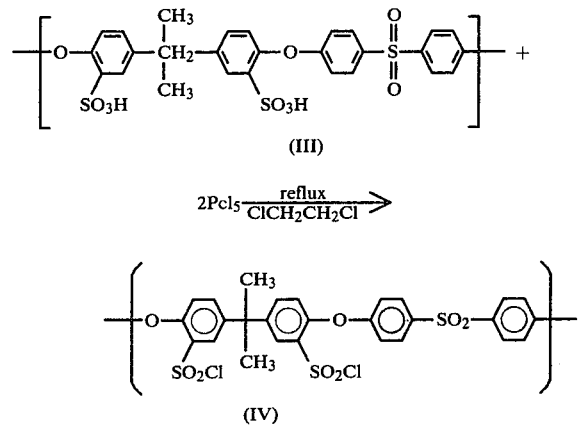

(III)

2PCl5 $\xrightarrow{\text{reflux}}$ ClCH2CH2Cl (IV)

wherein phosphorus pentachloride is employed as the chlorination agent. Other rechlorinating agents may be employed, such as phosphorus trichloride, thionyl chloride, oxalyl chloride and the like. Advantageously, the chlorination is carried out in bone dry dichloroethane under an atmosphere of dry nitrogen and with continuous agitation. The chlorination agent is used in an amount stoichiometrically in excess of the available hydroxysulfonyl sites on the polysulfone sulfonate. The chlorination may be carried out over a wide range of temperatures, preferably within the range of from about 35° C. up to reflux temperature for the reaction mixture. Upon completion of the reaction (which may be observed by disappearance of the starting sulfonate) the polysulfone sulfonyl chloride product may be separated from the reaction mixture by conventional methods, i.e.; distillation of the solvent etc. The polysulfone sulfonyl chloride is a valuable intermediate for the preparation of corresponding polysulfone sulfonamide. Conversion to the corresponding sulfonamide does not require complete separation of the sulfonyl chloride product from the reaction mixture, but the crude product may be used.

The polysulfone sulfonamides of the invention are prepared by reacting the polysulfone sulfonyl chlorides of the invention with ammonia or an amine. The reaction may be represented schematically by the formulae:

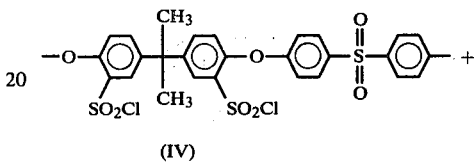

(IV)

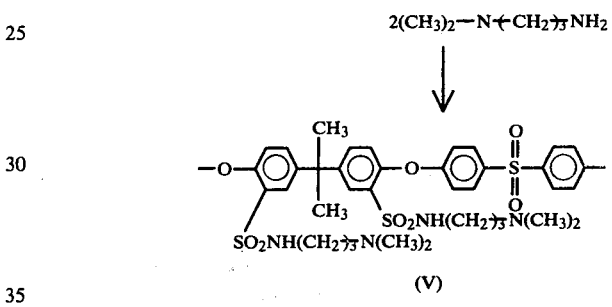

(V)

wherein N,N-dimethyl-1,3-propanediamine is employed as the amine reagent. A wide range of amine reagents may be employed to prepare the corresponding sulfonamide. For example, in addition to ammonia, one may employ primary and secondary aliphatic amines containing from 1 to 4 carbon atoms (e.g. methylamine, ethylamine, propylamine, isopropylamine, butylamine, dimethylamine, etc.) to give the corresponding N-substituted sulfonamides; with primary and secondary aminoalcohols containing from 2 to 6 carbon atoms (e.g. ethanolamine, diethanolamine, 2-amino-1-butanol, hexanolamine, etc.) to give the corresponding N-hydroxyalkyl sulfonamides; with N,N-dialkyl alkane diamines containing from 2 to 4 carbon atoms (e.g. N,N-dimethyl ethanediamine, N,N-dimethyl propanediamine, etc.) to give the corresponding N,N-dialkylaminoalkyl sulfonamides; with arylamines (e.g. aniline, naphthalene, N-methyl aniline, etc.) to give the corresponding N-aryl substituted sulfonamides; with heterocyclic amines (e.g. the C-amine pyridines such as 2-amino pyridine, etc.) to give the corresponding N-heterocyclic group substituted sulfonamides; and the like.

In preparing the sulfonamides, stoichiometric proportions of the reagents may be employed, although an excess of the amine reactant is preferred. The reaction proceeds over a wide range of temperatures, preferably from about room temperature to 100° C. The product sulfonamide may be separated from the reaction mixture by conventional techniques of distillation, filtering and washing. The anionic (sulfonamide) sites may also be quaternized if desired by reaction with an alkyl halide. The quaternization proceeds according to the schematic formulae:

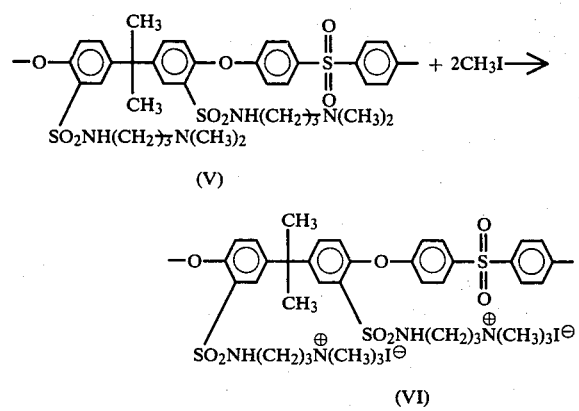

wherein methyl iodide is used as the alkyl halide.

The product sulfonamides are recoverable from the reaction mixture by conventional techniques and are useful as separatory membranes.

The following examples describe the manner and process of making and using the invention and set forth the best mode contemplated by the inventors for carrying out the invention but are not to be construed as limiting.

EXAMPLE 1

A polysulfone of the formula (I) given above (Udel P3500; Union Carbide) was sulfonated with sulfur trioxide, (stabilized Sulfan B. Allied Chemical). A 2:1 $SO_3$/polymer molar ratio was used in the sulfonation, according to the following procedure.

2500 ml of methylene chloride was charged into a three necked, 4 liter reaction flask, fitted with a mechanical stirrer, a 1 liter addition funnel and 500 ml addition funnel with an argon inlet fitted on the top. The charge was cooled to 0°–5° C. with an external ice-acetone bath. Then, 125 g. (0.283 moles) of the polysulfone (Udel P3500 predried for 4 hours at 150° C. was dissolved in 940 ml of methylene chloride at room temperature and the solution then transferred into the 1 liter addition funnel. A mixture of 26 ml (0.455 moles) of sulfur trioxide and 225 ml of methylene chloride was placed into the 500 ml addition funnel. The solution of Udel P3500 and the sulfur trioxide solution were added simultaneously over a period of one hour to the cooled and well stirred methylene chloride charge. After the addition was completed, the resulting mixture was stirred for an additional 3 hours at 0°–5° C. and then brought to room temperature. The prepared sulfonated polysulfone was found to be of a high degree of substitution (IEC of 2.8 meq/g) and was immediately subjected to rechlorination without additional workup as described below.

The reaction flask was fitted with a thermometer, drying tube, Dean Stark distillation receiver and reflux condenser. Then, 131 g (0.57 moles) of phosphorus pentachloride powder and 2.5 l. of dichloroethane were added to the stirred suspension of sulfonated polysulfone. The suspension was warmed gradually to reflux. Residues of the low boiling methylene chloride were removed and the temperature gradually raised to ≈83° C. (e.g. reflux of 1,2-dichloroethane). After three days of refluxing the suspension cleared and formed a brown viscous solution. The solution was filtered through glass wool to remove gel particles and the filtrate was placed into a three necked 4 liter reaction flask. The volume was then reduced to approximately 1.5 liter by distilling off surplus dichloroethane. The polymeric mass was poured into an ice chilled isopropyl alcohol bath, the precipitant (taffy-like) was collected, rinsed with isopropyl alcohol and redissolved in methylene chloride. The solvent was then evaporated at room temperature. The sticky product was poured into ice water and isopropyl alcohol mixture (3:1) and broken up in a blender, the precipitate filtered and washed with water until the filtrate was neutral. The polysulfone sulfonyl chloride product was then dried in a vacuum oven at 40° C. ($10^{-2}$ torr) to a constant weight. Analysis of the reaction product revealed that the polymer contained 3.4 meq/g of $SO_2Cl$ groups (chlorine content of the material was 12.2%).

EXAMPLE 2

140 g (0.22 moles) of polysulfone sulfonyl chloride prepared as in Example 1, supra., was dissolved in 1.5 liters of methylene chloride. The solution was cooled to 5° C. and 88 g of N,N-dimethyl-1,3-propanediamine dissolved in 500 cc of methylene chloride was added slowly to the solution with vigorous stirring. The resulting clear brown solution was stirred for an additional two hours and solvent distilled off to a volume of approximately 1 liter. The product was precipitated in acetone, the sludge precipitate broken up with an ice water-acetone mixture in a blender and filtered. The filtered product was washed with deionized water until a neutral pH and dried in a vacuum oven at 40° C. ($10^{-2}$ torr) to a constant weight. The nitrogen content of the thus prepared weakly anionic sulfonamide derivative of a polysulfone was 6.9% (theoretical 7.2%) and the measured anion exchange capacity −2.1 meq/g.

EXAMPLE 3

58 g (0.075 moles) of the polysulfone sulfonyl chloride prepared as described in Example 2 was dissolved in 600 ml of methylene chloride and the solution, kept under an argon blanket, was cooled to 5° C. Then, 10 cc (0.156 moles) of methyl iodide dissolved in 100 cc of methylene chloride was added slowly to the vigorously stirred solution over a 30 minute period. The coolant was then removed and the reaction mixture stirred at room temperature for an additional 2 hours. The precipitate, that had already formed during the addition of methyl iodide, was isolated, washed with methylene chloride, broken up in a blender with acetone-ice water mixture, filtered and washed with deionized water. The quaternized sulfonamide derivative of the polysulfone was finely dried in a vacuum oven ($10^{-2}$ torr, 50° C.) to a constant weight. The nitrogen counter of thus prepared sulfonamide derivative of polysulfone with strong anion exchange sites was 5.4% (theoretical 5.3%) and the anion exchange capacity −3.5 meq/g.

EXAMPLE 4

A polysulfone was sulfonated with chlorosulfonic acid in methylene chloride solution, in a set-up that consisted of a 4 liter reaction flask fitted with a mechanical stirrer and a 1 liter addition funnel. The reaction mixture throughout the sulfonation was kept under a dry argon blanket. The procedure was as follows:

250 g (0.566 moles) of polysulfone (Union Carbide Udel P3500) was predried for 4 hours at 150° C. and then dissolved in 2.5 l. of methylene chloride (Dow reagent grade). Then, 56 cc (0.849 moles) of chlorosulfonic acid (Kodak reagent grade; dissolved in 504 cc of methylene chloride) was added slowly within a 90 minute period to the vigorously stirred polymer solution (kept at a temperature of 0°–5° C.). After the addition was completed the coolant was removed and the reaction mixture stirred for an additional 120 minutes allowing the temperature to gradually rise to room temperature. After the 120 minutes had elapsed, the reaction was terminated, the top methylene chloride layer decanted and the precipitate washed twice with fresh methylene chloride. The product was then dissolved in 1.1 l of isopropyl alcohol/water (90/10 by volume) to obtain a golden yellow solution. The solution was rotary evaporated to dryness and finally dried in a vacuum oven to a constant weight, ($10^{-2}$ torr, 40° C.). The ion-exchange capacity of the product sulfonated polysulfone was found to be 1.9 meq/g.

100 g of sulfonated polysulfone prepared as described above was suspended in 1.5 l. of 1,2-dichloroethane and 5 cc of thionyl chloride added to the vigorously stirred reaction mixture. The thionyl chloride reacted violently with water residues. 105 g (0.46 moles) of phosphorus pentachloride powder was then added to the reaction mixture and the temperature raised to reflux. After four days of refluxing the suspension cleared and formed a brown viscous solution. The product was worked up as described in Example 1, supra., to yield a polysulfone sulfonylchloride with chlorine content of 6.4%.

EXAMPLE 5

15 g of polysulfone sulfonylchloride prepared as described in Example 4, supra., was dissolved in 100 cc of methylene chloride. The solution was cast on a glass plate and drawn down to a thickness of 100 u with a Gardner knife. The solvent was swept with a stream of dry nitrogen and the film was finely dried at 100° C. for 30 minutes. The film of polysulfone sulfonylchloride was then immersed into a solution of 5 cc of 1,6-hexanediamine and 25 cc of N,N-dimethyl 1.3-propanediamine in 200 cc of dry ethyl ether for 4 hours. The crosslinked film of polysulfone sulfonamide was washed with methanol and the weak anionic sites quaternized by immersing the film into 10% solution of methyl iodide in methanol. The anion exchange capacity of the prepared membrane was 1,1 meq/g and the electrical resistance $-28^{ohm}/cm^2$ (measured in 1. ON KCl solution at 25° C.). The permselectivity of the membrane estimated from the membrane potential measured between the 0.1 N and 1.0 N KCl solutions was 95%.

What is claimed:

1. A polysulfone sulfonyl chloride having recurring units of the formula:

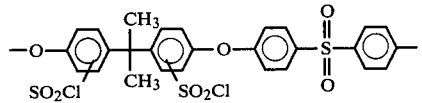

2. The sulfonamide reaction product of the compound of claim 1 and a member selected from the group consisting of ammonia and an amine.

3. The quaternized product prepared by reacting the sulfonamide reaction product claim 2 with an alkyl halide.

* * * * *